Nov. 16, 1948.    W. GRAVES    2,454,159
GUIDE SLEEVE CONSTRUCTION FOR PLUG GAUGES
Filed June 29, 1944    2 Sheets-Sheet 1
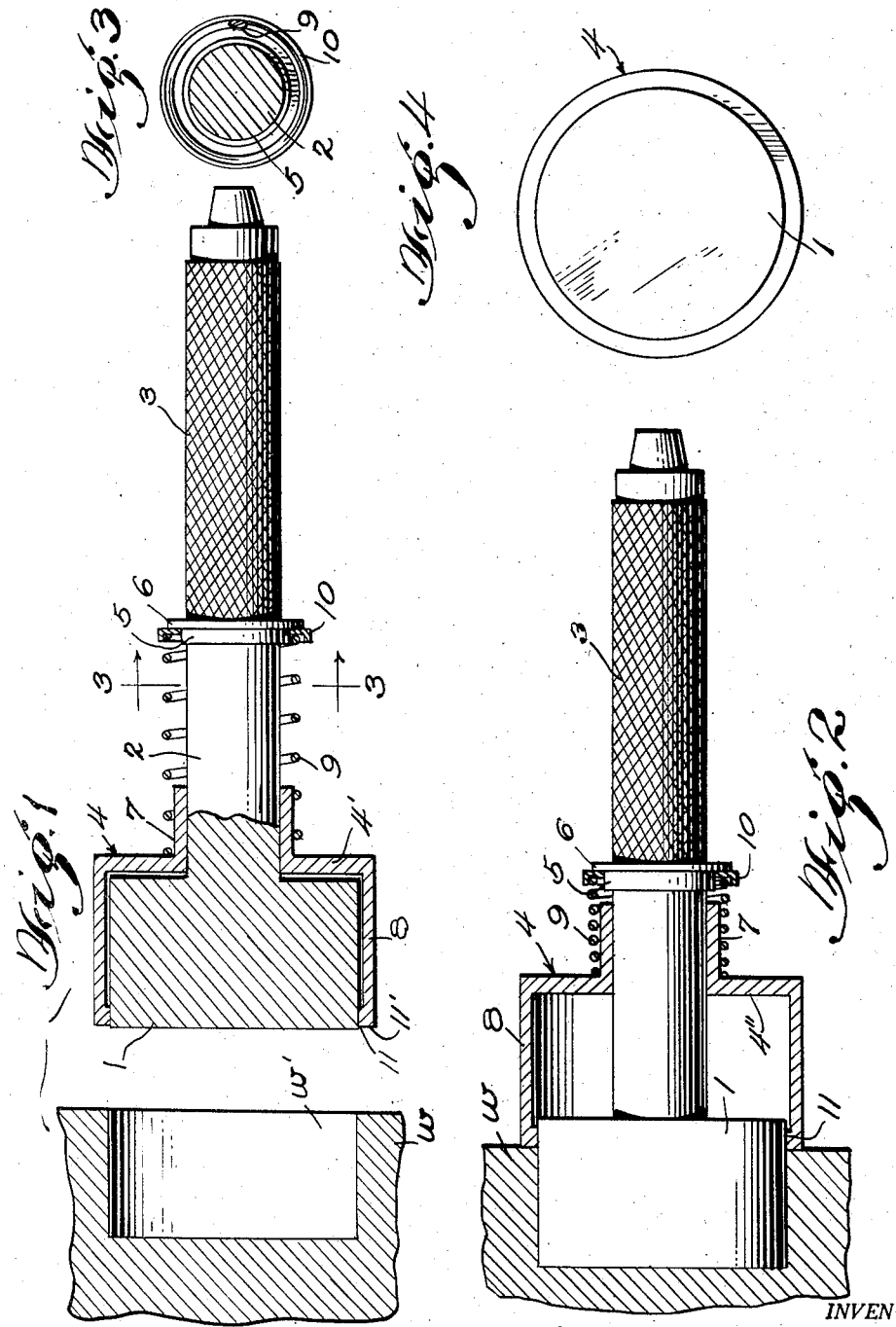
INVENTOR.
Walter Graves
BY
Robert C. Demmien
ATTORNEY Nov. 16, 1948. W. GRAVES 2,454,159
GUIDE SLEEVE CONSTRUCTION FOR PLUG GAUGES
Filed June 29, 1944 2 Sheets-Sheet 2
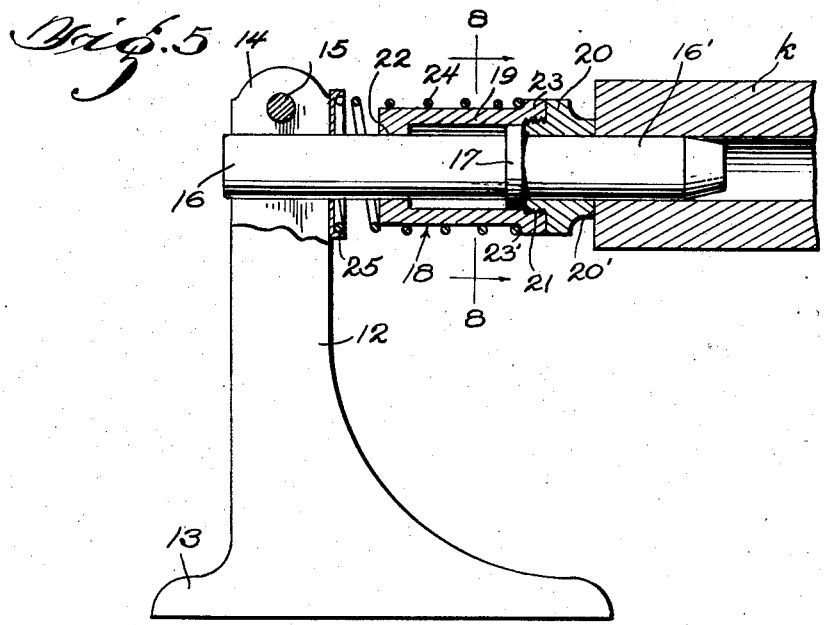
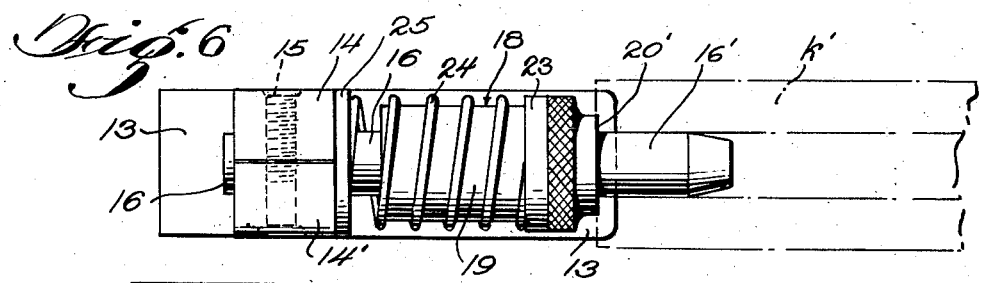
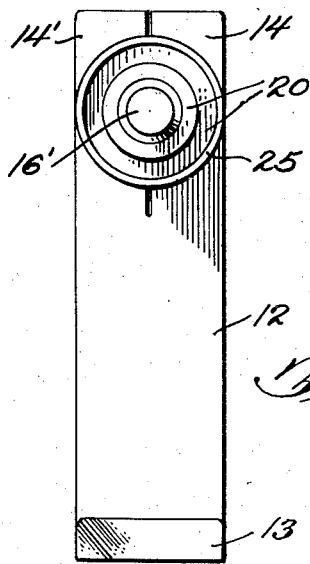
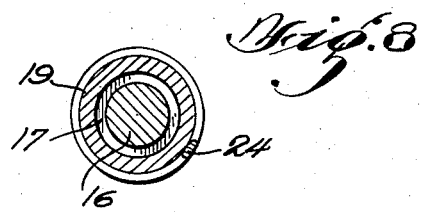
INVENTOR.
Walter Graves
BY
Robert J. Dennison
ATTORNEY Patented Nov. 16, 1948

2,454,159

UNITED STATES PATENT OFFICE 2,454,159

GUIDE SLEEVE CONSTRUCTION FOR PLUG GAUGES

Walter Graves, Ann Arbor, Mich., assignor, by mesne assignments, to Federal Products Corporation, Providence, R. I., a corporation of Rhode Island Application June 29, 1944, Serial No. 542,703

1 Claim. (Cl. 33—178B)

The object of my invention is to provide a guide sleeve for plug gauges which serves to line up the plug gauge with the hole, opening or recess of a piece of work, into which the plug is introduced or inserted.

One of the important objects of my invention is to provide a guide sleeve and to mount it in a spring actuated condition on a plug gauge in combination with cooperating stops on the sleeve and plug gauge, so that when the gauge is not in use the plug gauge shall extend slightly beyond the aligning critical face portion of the sleeve, whereby when the initial insertion of the plug into the recess is made, the critical face portion of the sleeve will automatically align the axis of the plug with the axis of the recess.

It is another object of my invention to provide a spring actuated guide sleeve for a plug gauge in which both the sleeve and plug have a common axis and the critical face portion of the sleeve shall define a plane at right angles to the common axis aforesaid.

It is a further object of my invention, therefore, to produce a device comprising a plug gauge which, in combination with my novel aligning guide sleeve having the critical face portion, facilitates and expedites the initial insertion of the plug into an opening as well as the completed insertion into said opening. In this connection my device is particularly useful for so-called bottom holes, where the size of the hole has to be measured or tested accurately down to the bottom of the hole.

It is quite evident that standard methods or constructions known prior to my invention, are inadequate and insufficient to expedite and facilitate the entrance and full insertion of plug gauges into the holes, openings or recesses.

It is still another object of my invention to produce a novel guide sleeve per se, having a critical face engaging portion in combination with stops to limit the movement of the sleeve on its plug gauge construction.

It is also to be observed that my novel guide sleeve may be used in connection with any variety of plug gauges such as electrical, pneumatic or the solid variety of plug gauges.

Conversely, my invention relates to improvements in testing devices, comprising plug gauges and more particularly to a guide sleeve construction having a critical face portion for plug gauges, wherein the sleeve, when in engagement with the work throughout its whole forward critical face portion, indicates that the axis of the recess in the work is directionally accurate, i. e., the axis of the recess is at right angles to the recessed face portion of the work.

The features of novelty and utility will be more fully observed from the detailed description of the drawings, wherein:

Figure 1 is a side elevation of a plug gauge partly in section centrally and longitudinally showing my invention applied thereto;

Figure 2 is a side elevation of a plug gauge applied to the work showing my improved sleeve construction in central and longitudinal section;

Figure 3 is a transverse section through the stem or shank of the plug gauge as indicated by the line 3—3 of Figure 1, looking in the direction of the arrows;

Figure 4 is a view in end elevation of the plug gauge having my improved sleeve construction applied thereto;

Figure 5 is a modification of my invention in longitudinal central section with the bench support partly broken away at the top and the remainder thereof in side elevation;

Figure 6 is a plan view of the construction disclosed in Figure 5, with the work shown in dot and dash lines instead of full lines as in Figure 5;

Figure 7 is an end elevation from the front end of the bench type of construction without any work applied thereto; and Figure 8 is a transverse section taken on the line 8—8 of Figure 5 looking in the direction of the arrows.

In the drawings, Figures 1, 2, 3 and 4 disclose a portable plug gauge having the improved sleeve construction applied thereto.

The plug 1 is provided with a stem or shank 2, a handle grip portion 3, and a sleeve 4. At the junction of the stem 2 and the handle grip portion 3 is located a stop ring 5 having a flange 6 fixedly embracing the stem and handle grip portion. The sleeve 4 is provided with two concentric portions 7 and 8 extending in opposite directions from the base 4' of the sleeve 4, the concentric sleeve portion 7 closely and telescopically or slidably engages the stem 2.

The inner portion of the base 4' defines a stop 4'' and the end of the sleeve portion on the stem also defines a stop which may engage the stop ring 5. The shoulder formed by the plug 1 at its juncture with the shank or stem 2 also defines a stop which engages the base 4' at 4'' as the sleeve 4 is propelled forwardly by the spring 9. The outer portion of the base 4' also defines a stop for one end of the spring 9. This arrangement of stops prevents the dislocation of any of the movably related cooperating parts of the device.

The helical compression spring 9 surrounds the sleeve portion 7 and the stem 2 and engages the flanged stop washer or abutment 10 at one end and the stop, abutment, or base 4' at its other end. The sleeve portion 8 is provided with an inwardly extending annular flange 11 at its critical face portion 11'. the flange 11 closely and slidably or telescopically engages the plug 1.

In normal condition, the plug 1 extends slightly beyond the critical face portion 11' to facilitate and expedite the insertion of the plug 1 into the recess W' in the work W. The spring 9 actuates or urges the sleeve 4 toward the free end of the plug 1 and in combination with the critical face portion 11' in automatically aligning the axis of the plug 1 with the axis 7 of the recess. The amount of the extension of the plug 1 beyond the critical face portion 11' may be more or less than one sixteenth of an inch.

When the plug 1 is properly fitted initially into the recess W' the critical face portion 11' of the sleeve 4 engages the face of the work and thereby automatically aligns the plug axis with the axis of the recess, if these conditions exist or continue, through the completed insertion of the plug, then it is observed that the recess W' is properly directionally located, that is, the axis of the recess is at right angles to the face of the work W as it should be.

On the other hand, if the critical face portion 11' of the sleeve 4 touches the face of the work at only one point, then the recess W' and the axis thereof is not properly and directionally located and if the angular position of the recess cannot be corrected, the work must be discarded as being unfit for use as the test clearly indicates.

In some work where recesses are required, their angular location with reference to the surface of the work is an important factor and my improved novel aligning sleeve 4 in connection with the testing plug 1 and spring actuated sleeve serves a very important and useful purpose, in testing the angular dispositions of the recesses. In our present day mass production tests for accuracy this is of extreme importance.

In the use of my testing device the plug 1 must fit the recess quite accurately and every recess of different size must have a plug of complemental size to accurately fit it.

From the above description the operation of my device appears to be clear. Suffice to say that the device is portable and is brought to the work and the plug 1 is automatically aligned by my novel sleeve construction and is inserted in to the recess so that the free end of the plug 1 engages the bottom of the recess and then while held in this position against the tension of the spring 9, it is the operator's duty to ascertain whether the critical face portion accurately engages all portions of the surface of the work surrounding the recess.

In the modification, disclosed in Figures 5 to 8, inclusive, the device is not portable and may be secured to a bench or other suitable support so that the work k or k' may be brought to the device to be tested.

The standard 12 has a foot portion 13 that may be secured to a support by any suitable means such as screws or bolts (not shown). The upper portion of the standard 12 is provided with a split head 14, 14' having opposed arcuate recesses to receive one end of a shank or stem 16. The stem 16 is clamped in position in the split head 14, 14' by a suitable bolt 15. The stem 16 is provided with a ring-like stop 17, located intermediate the ends of said stem.

One end of said stem 16 is provided with a plug portion 16' adapted to enter an aperture or recess of complemental size such as shown in the work k, k' of Figures 5 and 6. A two part sleeve 18 comprising the sections 19 and 20, which are connected together while on the stem 16 by complemental screw threaded portions 21. The section 20 accurately, telescopically and slidably embraces the plug portion 16' and is adapted to abut one side of the stop 17.

The sleeve 18 slidably engages the stop 17 adjacent one end portion thereof while the opposite end portion is provided with an inwardly extending annular flange 22 which slidably engages the stem 16. The threaded end portion of the section 19 is also provided with a flange 23 defining an annular stop or abutment 23' adapted to be engaged by one end of a helical compression spring 24.

A flanged washer 25 forms a spring abutment or stop and is fitted on the stem 16 and rests against one side of the split head 14, 14' and receives the opposite end of the spring 24 whereby the sleeve 18 is urged toward the end of the plug portion 16'. The section 20 is provided with a critical face portion 20' which is adapted to align the apertured or recessed work k or k' automatically with the axis of the plug 16' and sleeve 18.

The operation of aligning the plug 16' automatically with the work through the medium of my novel sleeve construction is the same as that described in the portable device of Figures 1 to 4, inclusive, except that in the bench type of gauge, the work is carried to the bench type device, whereas in the portable type device the device is carried to the work.

In both embodiments, the critical face portion of the sleeve defines a plane at right angles to the axis of its associated stem. The critical face portion of the sleeve may serve both as an automatic aligning means and as a test for angularity of the recesses.

In the specification it has been indicated generally that the subject matter of Fig. 1 is portable, but it also appears to be self-evident that the standard 12 displayed in Fig. 5 may be clamped on the handle portion 3 or stem portion 2 of Fig. 1. The so-called standard 12 may also serve as a handle grip—like a pistol grip.

It has also been generally indicated in the specification that the subject matter of Fig. 5 is not portable but stationary. It is, however, self-evident that the device is not stationary unless it is secured to a stationary support. It is also to be understood that the subject matter of Fig. 5 may be used in a portable way or manner and the standard 12 may serve as a handle grip—like a pistol grip.

I have disclosed two embodiments of my invention which are merely illustrative, therefore variations may be resorted to as long as such variations come within the purview of the subject matter claimed herein.

Having fully shown and described my said invention, what I claim is:

A plug gauge aligning device comprising a sleeve and a stem, spaced concentric guiding portions provided on said sleeve slidably engaging respectively the plug and the stem and arranged in accurately sliding relation to each other, said stem having a handle portion at one end and an inserting plug portion at its other end, said sleeve having a base portion defining a spring abutment, a spring abutment located on the stem, a spring surrounding a portion of said sleeve and a portion of said stem, said spring being located between said abutments and yieldingly engaging the same to urge said sleeve toward the free end of said plug, said plug extending slightly beyond said sleeve when said device is not in use to initially facilitate the insertion of the plug into a recess of a piece of work.

WALTER GRAVES.

REFERENCES CITED

The following references are of record in the file of this patent:

UNITED STATES PATENTS

| Number | Name | Date |
|---|---|---|
| 1,206,202 | Bright | Nov. 28, 1916 |
| 1,440,441 | Blood | Jan. 2, 1923 |
| 1,794,797 | Rockwell | Mar. 3, 1931 |
| 2,139,282 | Poock | Dec. 6, 1938 |
| 2,200,885 | Johnson | May 14, 1940 |
| 2,349,879 | Ogren | May 30, 1944 |